(12) United States Patent
Fisher et al.

(10) Patent No.: US 11,821,647 B2
(45) Date of Patent: Nov. 21, 2023

(54) SEMI-RIGID DUCT SYSTEM

(71) Applicant: ABC Canada Technology Group Ltd., Saskatoon (CA)

(72) Inventors: Thomas Fisher, Saskatoon (CA); Michael Schulte, Saskatoon (CA); Leigh Yausie, Saskatoon (CA); Dhanesh Somanah, Saskatoon (CA); Derrick Ryce, Saskatoon (CA); Jordan Melrose-Wyatt, Saskatoon (CA)

(73) Assignee: ABC Canada Technology Group Ltd., Saskatoon (CA)

( * ) Notice: Subject to any disclaimer, the term of this patent is extended or adjusted under 35 U.S.C. 154(b) by 166 days.

(21) Appl. No.: 16/937,477

(22) Filed: Jul. 23, 2020

(65) Prior Publication Data

US 2021/0071901 A1   Mar. 11, 2021

(30) Foreign Application Priority Data

Sep. 5, 2019   (CA) .................................. CA 3054121

(51) Int. Cl.
 *F24F 13/02* (2006.01)
 *F16L 37/098* (2006.01)
(52) U.S. Cl.
 CPC ........ *F24F 13/0218* (2013.01); *F16L 37/098* (2013.01); *F24F 13/0209* (2013.01)
(58) Field of Classification Search
 CPC ............... F24F 13/0218; F24F 13/0209; F24F 13/0272; F16L 37/098; F16L 9/17;
 (Continued)

(56) References Cited

U.S. PATENT DOCUMENTS 2,225,556 A * 12/1940 Delaney .................... F16L 9/02
138/167
3,517,702 A *  6/1970 Trimble ............... H02G 3/0481
174/DIG. 11

(Continued)

FOREIGN PATENT DOCUMENTS

CA      2261538 A1 *  8/2000  .......... F24F 13/0209
CA      2974617 A1 *  7/2016  .............. E21F 1/006

(Continued)

OTHER PUBLICATIONS

Canadian Office Action received for Canadian Serial No. 3,054,121 dated Feb. 16, 2021, 3 pgs.

*Primary Examiner* — Edelmira Bosques
*Assistant Examiner* — Brett Peterson Mallon
(74) *Attorney, Agent, or Firm* — Spencer Fane LLP

(57) ABSTRACT

A duct system is formed from a plurality of tubular sections each formed from a flexible panel with tapering sides. Inner and outer joiner plates are attached to one side edge and the second side edge is inserted in the recess between the plates and fastened such that each section has a first open end and a second slightly larger open end. Anchors are spaced around each end of each tubular section. The first end of each tubular section is inserted into the larger second end of an adjacent tubular section and an end pulling element is connected between the anchors on adjacent sections an operated to draw the connected first and second anchors together to make a substantially air tight seal between the tubular sections.

31 Claims, 4 Drawing Sheets

(58) Field of Classification Search
CPC ... F16L 9/22; F16L 31/00; F16L 11/00; F16L 3/00; F16L 11/042; E21F 1/06; B65G 11/10; B65G 11/14; B65G 11/08
See application file for complete search history.

(56) References Cited

U.S. PATENT DOCUMENTS

| | | | | |
|---|---|---|---|---|
| 3,807,540 | A * | 4/1974 | Boulet | B65G 11/146 |
| | | | | 193/25 E |
| 3,949,850 | A * | 4/1976 | Schumm | B65G 11/083 |
| | | | | 193/25 E |
| 5,472,768 | A * | 12/1995 | Anson | B65G 11/083 |
| | | | | 193/25 E |
| 8,336,925 | B2 | 12/2012 | Paquet | |
| 2005/0109415 | A1* | 5/2005 | Snyder | F24F 13/0209 |
| | | | | 138/162 |
| 2018/0106396 | A1* | 4/2018 | Morton | E06B 1/30 |
| 2018/0186573 | A1* | 7/2018 | Malmberg | B65G 11/10 |
| 2019/0285309 | A1* | 9/2019 | Raeburn | F16L 25/0045 |

FOREIGN PATENT DOCUMENTS

| | | | | |
|---|---|---|---|---|
| CA | 2974617 A1 | 7/2016 | | |
| GB | 1576858 A | 4/1977 | | |
| GB | 2162278 A * | 1/1986 | | E21F 1/04 |
| WO | 1982/001926 A1 | 6/1982 | | |
| WO | WO-8201926 A1 * | 6/1982 | | |

\* cited by examiner

SEMI-RIGID DUCT SYSTEM

This disclosure relates to the field of duct systems for carrying air streams in mines, tunnels, and the like and in particular a semi-rigid duct system that can be transported readily and assembled on site.

BACKGROUND

Air ducts are required to carry air to underground locations such as mines and tunnels. Such ducts are commonly made from flexible fabric which is light and can be collapsed for transport down into underground installation sites where space is limited. Such fabric ducts however have limitations when air pressures are quite high or when dealing with negative air pressures.

U.S. Pat. No. 8,336,925 to Paquet et al. discloses a duct system where flexible panels, which can be readily moved into a confined area such as a mine, are formed into tubular sections with edges connected and sealed on site. The sections are then connected end to end with collars sealed over ends of abutting adjacent tubular sections.

U.S. Pat. No. 5,472,768 to Anson discloses a tubular duct system where tapered flexible panels are formed into tapered tubular sections with edges that overlap and are fastened together. The panels have tapering edges such that when the edges are connected the diameter of one end is smaller than the diameter of the other end and the sections are joined by inserting the smaller end of one section into the larger end of the adjacent section in a telescoping manner. Sealing is not required in the illustrated application of a debris chute.

SUMMARY OF THE INVENTION

The present disclosure provides a semi-rigid duct system that overcomes problems in the prior art.

In a first embodiment the present disclosure provides a plurality of tubular sections connected together, each tubular section comprising a flexible panel having a length between first and second end edges thereof, a first width between first and second side edges at the first end edge, and second width between first and second side edges at the second end edge, wherein the first width is less than the second width. Inner and outer joiner plates are attached to inner and outer faces of the flexible panel along the first side edge and extend outward from the first side edge such that a recess is formed between the inner and outer joiner plates, and the second side edge is inserted into the recess and fastened in the recess to form the flexible panel into the tubular section with the inner joiner plate on an interior of the tubular section and the outer joiner plate on an exterior of the tubular section. Each tubular section has an open substantially circular first end with a first diameter at the first end edge of the panel and an open substantially circular second end with a second diameter at the second end edge of the panel, and wherein the first diameter is less than the second diameter. A plurality of first end anchors are spaced around each tubular section at a first anchor distance from the first end of the tubular section and a corresponding plurality of second end anchors are spaced around each tubular section at a second anchor distance from the second end of the tubular section. The first end of each tubular section is inserted into the second end of an adjacent tubular section such that a portion of the outer face of each tubular section proximate to the first end thereof bears against a portion of the inner face of the adjacent tubular section proximate to the second end thereof. Each of a plurality of end pulling elements is connected between one of the first anchors on one tubular section and one of the second anchors on the adjacent tubular section, and each end pulling element is operative to exert a force drawing the connected first and second anchors together.

In a second embodiment the present disclosure provides a method of providing a duct system. The method comprises forming a plurality of tubular sections, each tubular section formed by: providing a flexible panel having a length between first and second end edges thereof, a first width between first and second side edges at the first end edge, and second width between first and second side edges at the second end edge, wherein the first width is less than the second width; attaching inner and outer joiner plates to inner and outer faces of each panel along the first side edge such that the joiner plates extend outward from the first side edge such that a recess is formed between the inner and outer joiner plates; inserting the second side into the recess and fastening the second side edge in the recess to form the panel into the tubular section with the inner joiner plate on an interior of the tubular section and the outer joiner plate on an exterior of the tubular section; wherein each tubular section has an open substantially circular first end with a first diameter at the first end edge of the panel and an open substantially circular second end with a second diameter at the second end edge of the panel, and wherein the first diameter is less than the second diameter; attaching a plurality of first end anchors spaced around each tubular section at a first anchor distance from the first end of the tubular section; attaching a corresponding plurality of second end anchors spaced around each tubular section at a second anchor distance from the second end of the tubular section; inserting the first end of each tubular section into the second end of an adjacent tubular section; and connecting an end pulling element between each of the first and second anchors and operating each end pulling element to exert a force drawing the connected first and second anchors together such that the first end of each tubular section is forced into the second end of the adjacent tubular section and such that a portion of the outer face of each tubular section proximate to the first end thereof bears against a portion of the inner face of the adjacent tubular section proximate to the second end thereof.

The duct system of the present disclosure can be transported to a confined work site such as a mine or like tunnel, where the tubular sections can be quickly formed and installed by rolling the flexible panels such that the side edges can fastened together to form the tapered tubular sections. Then the smaller first end of one tubular section is simply inserted into the larger second end of the next tubular section and secured and tightened with the end pulling elements to form the duct system.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
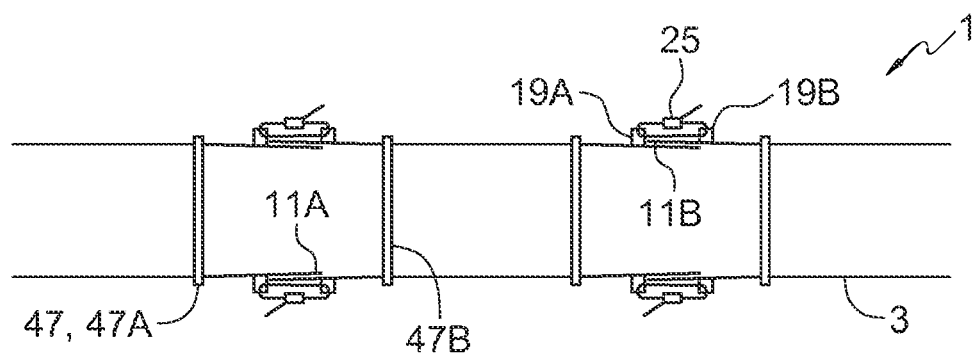
FIG. 1 is a schematic cut away side view of an embodiment of the duct system of the present disclosure.

FIG. 1 schematically illustrates an embodiment of a duct system 1 of the present disclosure comprising a plurality of tubular sections 3 connected together.

Figure 2:
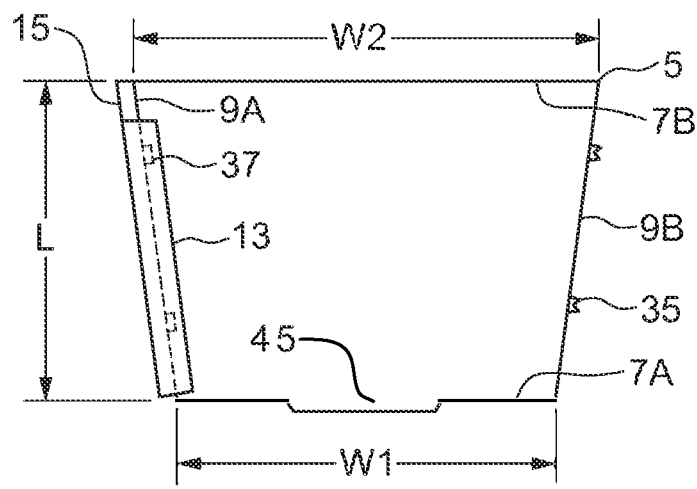
FIG. 2 is a schematic top view of a flexible panel of the embodiment of FIG. 1.

As shown in FIG. 2, each tubular section 3 comprises a flexible panel 5 having a length L between first and second end edges 7A, 7B thereof, a first width W1 between first and second tapering side edges 9A, 9B at the first end edge 7A, and a second width W2 between first and second side edges 9A, 9B at the second end edge 7B. The first width W1 is less than the second width W2 such that when the panel 5 is rolled up so the first and second side edges 9A, 9B are abutted, the tubular section 3 is formed with a slightly tapering shape so that the first end 11A of the tubular section 3 can be inserted into the second end 11B of an adjacent tubular section as illustrated in FIG. 1. Typically the difference between W1 and W2 will be less than one centimeter, and the difference in the widths W1, W2 shown in FIG. 1 exaggerated to illustrate the concept.

Figure 3:
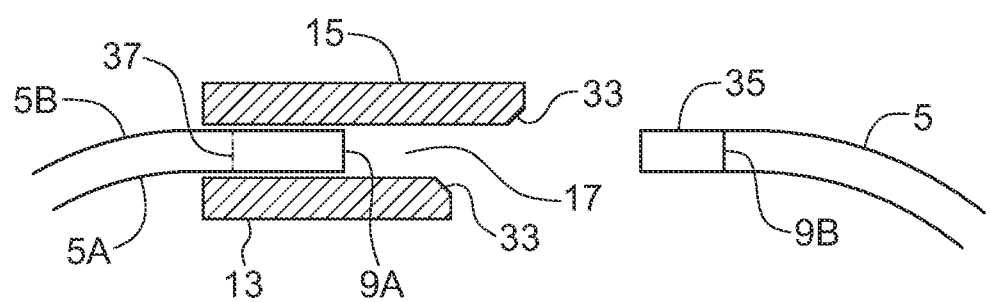
FIG. 3 is a schematic sectional end view of the embodiment of FIG. 1.
Figure 4:
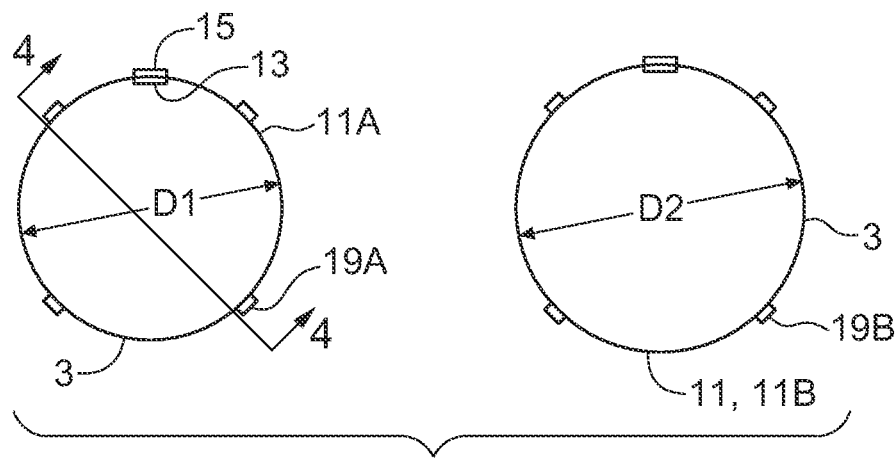
FIG. 4 is a schematic end view of the first and second open ends of a tubular section of the embodiment of FIG. 1.

Inner and outer joiner plates 13, 15 are attached to inner and outer faces 5A, 5B of each panel 5 along the first side edge 9A thereof, typically by rivets, adhesives, or the like, such that the joiner plates 13, 15 extend outward from the first side edge 9A. The flexible panel 5 is then rolled by raising the side edges 9A, 9B shown in FIG. 2 and bringing them together as shown in FIG. 3 and inserting the second side edge 9B into the recess 17 formed between the inner and outer joiner plates 13 and 15 and fastening the second side edge 9B in the recess 17 to form the panel 5 into the tubular section 3. As seen in FIG. 4 the inner joiner plate 13 is on an interior of the tubular section 3 and the outer joiner plate 15 is on an exterior of the tubular section 3.

Because of the tapering side edges 9A, 9B of the panel 5, each tubular section 3 has, as shown in FIG. 4, an open substantially circular first end 11A with a first diameter D1 at the first end edge 7A of the panel 5 and an open substantially circular second end 11B with a second diameter D2 at the second end edge 7B of the panel 5. The first diameter D1 is less than the second diameter D2 allowing the first end 11A of each tubular section 3 to be inserted into the second end 11B of the adjacent tubular section 3 to form the duct system 1.

Figure 5:
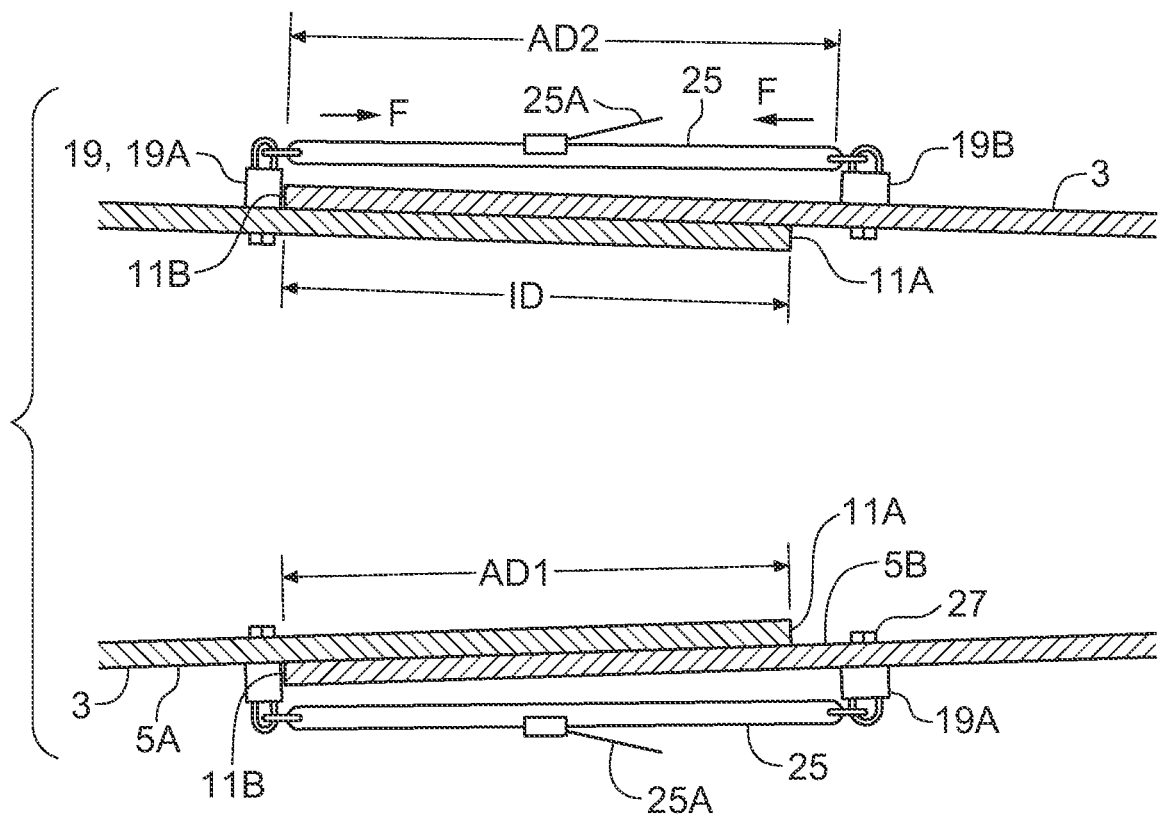
FIG. 5 is a schematic sectional view along line 4-4 in FIG. 4 of the connection of one tubular section with another tubular section of the embodiment of FIG. 1.

As shown in FIG. 5, a plurality of first end anchors 19A are spaced around each tubular section 3 at a first anchor distance AD1 from the first end 11A of the tubular section 3, and a corresponding plurality of second end anchors 19B are spaced around each tubular section 3 at a second anchor distance AD2 from the second end 11B of the tubular section 3. The first end 11A of each tubular section 3 is inserted into the second end 11B of an adjacent tubular section 3 such that a portion of the outer face 5B of each tubular section proximate to the first end 11A thereof bears against a portion of the inner face 5A of the adjacent tubular section 3 proximate to the second end 11B thereof.

The first end 11A of each tubular section 3 is inserted into the second end 11B of the adjacent tubular section 3 an insertion distance ID, and the first anchor distance AD1 is at least equal to or greater the insertion distance ID so the anchors do not interfere with the insertion. Typically the second anchor distance AD2 is greater the insertion distance ID so that the second anchors can be attached with fasteners 27 that extend past the inner face 5A of the tubular section 3 so that the fasteners 27 do not interfere with insertion.

An end pulling element, such as the illustrated cinch strap 25 is connected between the first end anchor 19A on one tubular section 3 and the second end anchor 19B on the adjacent tubular section 9. Pulling on the tail end 25A of the cinch strap 25 exerts a force F drawing the connected first and second end anchors 19A, 19B together, and when the tail end 25A is released, tension is maintained on the cinch strap 25. Tightening the cinch straps 25 around the periphery of the tubular section 3 causes the first end 11A of the tubular section 3 to move into the second end 11B of the adjacent tubular section 3 such that the outer face 5B of each tubular section bears quite tightly against the inner face 5A of the adjacent tubular section 3 to form a substantially air tight seal. The duct systems of the present disclosure are sometimes subjected to significant blast forces during mining operations and it is contemplated that the end pulling elements could be provided by a resilient elastic strap which would give rather than break in response to such blast forces.

Figure 6:
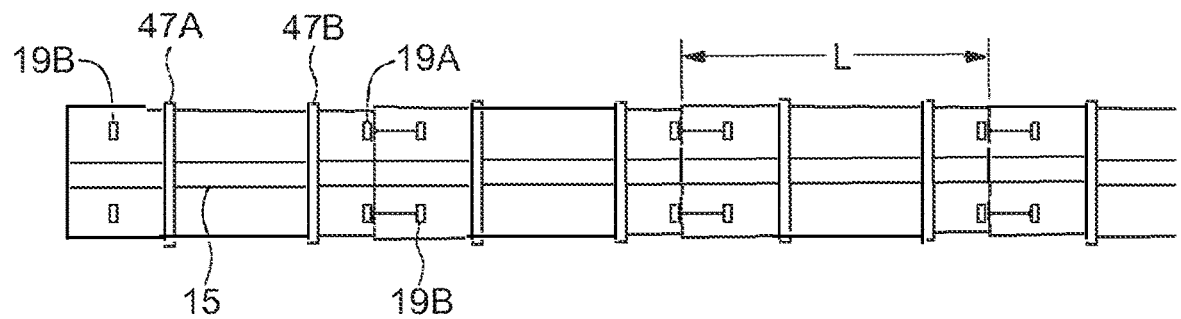
FIG. 6 is a schematic side view of the embodiment of FIG. 1 showing the joiner plates and first and second anchors aligned.

As shown in FIG. 6, the first end 11A of each tubular section is inserted into the second end 11B of the adjacent tubular section 3 such that the joiner plates 13, 15 and first end anchors 19A on each tubular section 3 are substantially aligned with the joiner plates 13, 15 and second end anchors 19B on the adjacent tubular section 3. Such configuring of the tubular sections 3 allows the user to align the visible outer joiner plates 15 and then the corresponding first and second end anchors 19A, 19B will be aligned as well.

Each tubular section 3 is formed such that each tubular section 3 is substantially airtight from the first end 11A thereof to the second end thereof 11B since the fit of the second side edge 9B in the recess 17 between the joiner plates 13, 15 is quite tight, and the connection of each tubular section 3 to the adjacent tubular section 3 is substantially airtight since the cinch straps 25 exert sufficient force to push the outer face 5B of each tubular section against the inner face 5A of the adjacent tubular section 3 such that little air escapes. While not completely air tight the connections are sufficiently air tight for the relatively low pressure, high flow rate ducting purposes contemplated for use with the disclosed system 1.

Figure 7:
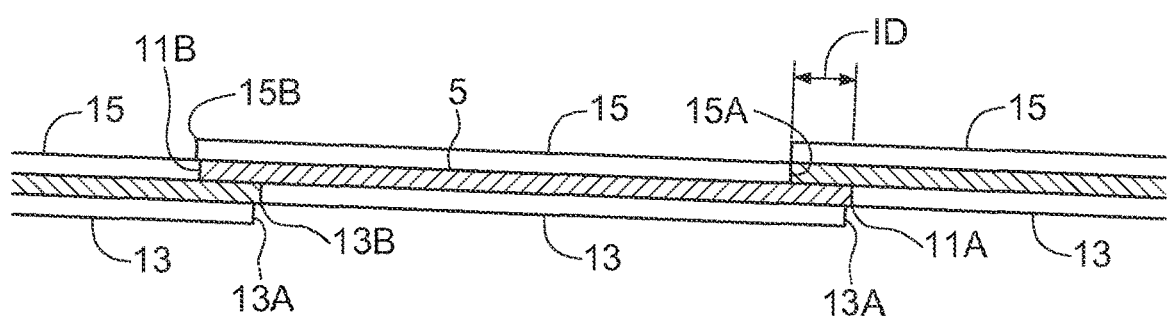
FIG. 7 is a schematic sectional side view of the connection of one tubular section with another tubular section of the embodiment of FIG. 1 showing the arrangement of the joiner plates and first and second ends of the tubular sections.

As schematically illustrated in FIG. 7, the first end 11A of each tubular section 3 is inserted into the second end of the adjacent tubular section the insertion distance ID. The outer joiner plate 15 is configured to extend from a first end 15A thereof located the insertion distance ID from the first end 11A of the tubular section 3 to a second end 15B thereof located at the second end 11B of the tubular section 3. Thus when assembled as in FIG. 6, the outer joiner plates 15 do not interfere with insertion and form a continuous plate along the outside of the duct.

The inner joiner plates 13 are configured to extend from a first end 13A thereof located forward or near the first end 11A of the tubular section 3 to a second end 13B thereof located the insertion distance ID from the second end 11B of the tubular section 3. With this configuration the inner joiner plate 13 does not interfere with insertion, and the recess 17 enclosing the second side edge 9B extends substantially the full exposed length of each tubular section 3 to prevent air from escaping.

Figure 8:
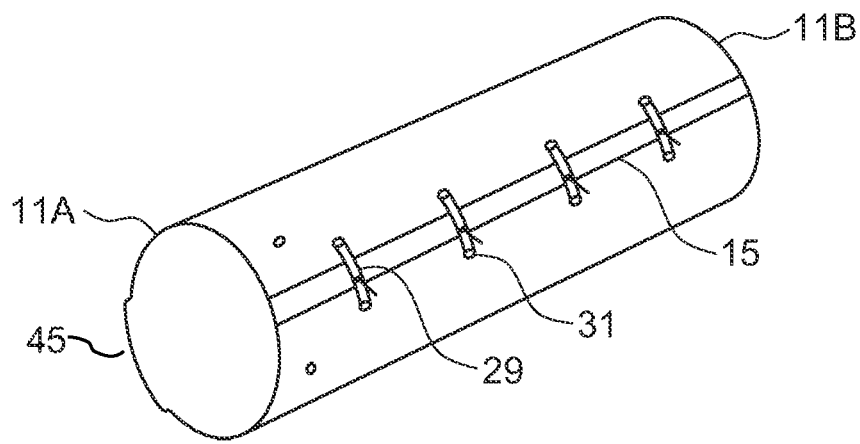
FIG. 8 is a schematic perspective view of a tubular section of the embodiment of FIG. 1.

As seen in FIG. 8 in each tubular section 3 the second side edge 9B is fastened in the corresponding recess 17 by a plurality of side pulling elements 29, each extending over the outer joiner plate 15 and connected to side anchors 31 attached to the tubular section 3 on each side of the outer joiner plate 15. The side pulling elements 29 can conveniently be provided by cinch straps 25, similar to the end pulling elements, that are operative to exert a force drawing the second side edge 9B into the recess 17.

To facilitate guiding the second side edge 9B into the recess 17, outer joiner plate 15 extends from the first side edge 9A of the flexible pane 5 a greater distance than the inner joiner plate 13, as best seen in FIG. 3. When folding the edges 9A, 9B together the outer joiner plate 15 will keep the second side edge 9B from springing up before it is actually in the recess. The inner and outer joiner plates 13, 15 adjacent to the recess 17 are also chamfered with bevels 33 helping to guide the second side edge 9B into the recess 17.

To further facilitate forming the flexible sheet 5 into the tubular section 3 the illustrated system 1 also comprises a lock tab 35 extending from the second side edge 9B of each flexible panel 5 and a corresponding lock notch 37 defined in the first side edge 9A of each flexible panel 5. The lock tab 35 and lock notch 37 are configured such that when the second side edge 9B is inserted into the recess 17, the lock tab 35 flexes as it enters the lock notch 37 and locks into the lock notch 37.

Figure 9:
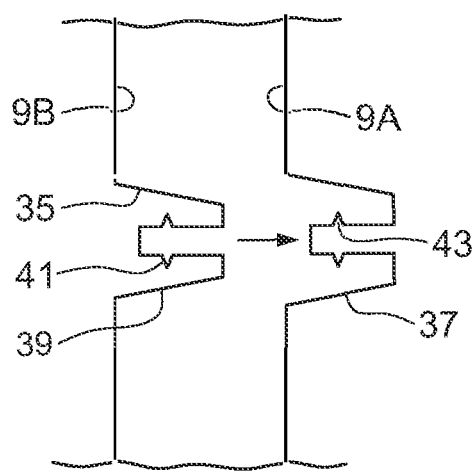
FIG. 9 is a schematic top view showing the lock tab in position to be inserted into the lock notch.
Figure 10:
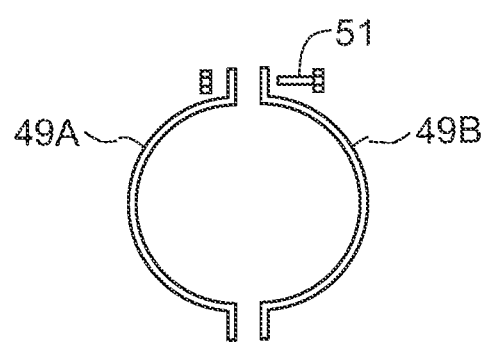
FIG. 10 is a schematic side view of the half rings that form the reinforcing rings.

As seen in FIG. 9, as the lock tab 35 moves in the direction of the arrow into the lock notch 37 the lock arms 39 will be flexed outward until the protrusions 41 on the tab 35 coincide with the indents 43 of the notch 37, where the lock arms 39 will flex back with the protrusions 41 locked in the corresponding indents 43.

To facilitate inserting the first end 11A of a tubular section 3 into the second end 11B of an adjacent tubular section 3, the first end edge 7A of each flexible panel 5 comprises a shoehorn element 45 extending from a middle portion of the first end edge 7A as seen in FIGS. 2 and 8. The shoehorn element 45 on one tubular section can be rested inside the second end 11B of the adjacent tubular section to help align the ends 11A, 11B for insertion.

To maintain the desired circular shape of the open ends 11 of the tubular sections 3, first and second reinforcing rings 47A, 47B are spaced along and extend around each tubular section 3. The illustrated reinforcing rings 47 each comprise two half rings 49A, 49B fastened to each other with bolts 51 or the like after the second side edge 9B is inserted into the recess 17 to form the tubular section 3.

The reinforcing rings 47 are configured to correspond to an outside diameter of the tubular section 3 to substantially prevent deformation of the open ends 11 and maintain the circular shape to facilitate insertion. Since the tubular sections 3 are tapered slightly, the outside diameter will vary slightly along the length of the tubular section 3, and the bolts 51 can be tightened or loosened somewhat to accommodate these variations.

Where negative air pressures are contemplated further reinforcing rings may be added spaced along the length of the tubular sections 3 between the first and second reinforcing rings 47A, 47B.

Figure 11:
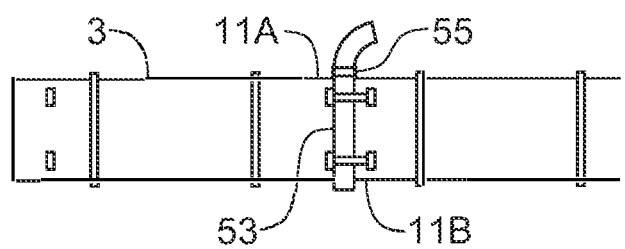
FIG. 11 is a schematic side view of a band wrapped around the second end of the tubular section 3.

FIG. 11 schematically illustrates a sealing band 53 wrapped around the second end 11B of each tubular section 3, and a band tightener 55, such as a ratchet or buckle, operative to exert a tightening force on the sealing band 53 to force the inner face 5A of the second end portion of each tubular section 3 against the outer face 5B of the first end portion of the adjacent inserted tubular section. Typically the sealing band 53 will be wrapped around the second end of the tubular section before the cinch straps 25 are connected between the adjacent tubular sections so the band 53 will lie flat against the outer surface of the tubular section 3. The sealing band 53 can be tightened after the insertion is complete and will act to further seal the connection of the tubular sections.

The present disclosure also provides a method of providing a duct system 1. The method comprises forming a plurality of tubular sections 3 where each tubular section 3 is formed by providing a flexible panel 5 having a length between first and second end edges 7A, 7B thereof, a first width W1 between first and second side edges 9A, 9B at the first end edge 7A, and second width w2 between first and second side edges 9A, 9B at the second end edge 7B, wherein the first width W1 is less than the second width W2, attaching inner and outer joiner plates 13, 15 to inner and outer faces 5A, 5B of each panel 5 along the first side edge 9A such that the joiner plates 13, 15 extend outward from the first side edge 9A such that a recess 17 is formed between the inner and outer joiner plates 13, 15 and inserting the second side edge into the recess 17 and fastening the second side edge 9B in the recess 17 to form the panel 5 into the tubular section 3 with the inner joiner plate 13 on an interior of the tubular section and the outer joiner plate 15 on an exterior of the tubular section 3, wherein each tubular section 3 has an open substantially circular first end 11A with a first diameter D1 at the first end edge 7A of the panel 5 and an open substantially circular second end 11B with a second diameter D2 at the second end edge 7B of the panel 5, and wherein the first diameter D1 is less than the second diameter D2; attaching a plurality of first end anchors 19A spaced around each tubular section 3 at a first anchor distance AD1 from the first end of the tubular section 11A; attaching a corresponding plurality of second end anchors 19B spaced around each tubular section at a second anchor distance AD2 from the second end 11B of the tubular section 3; inserting the first end 11A of each tubular section into the second end 11B of an adjacent tubular section 3; and connecting an end pulling element 25 between each of the first and second end anchors 19A, 19B and operating each pulling element 25 to exert a force F drawing the connected first and second anchors 19A, 19B together such that the first end 11A of each tubular section is forced into the second end 11B of the adjacent tubular section 3 and such that a portion of an outer face 5B of each tubular section proximate to the first end 11A thereof bears against a portion of an inner face 5A of the adjacent tubular section 3 proximate to the second end 11B thereof.

The duct system 1 of the present disclosure can be transported to a confined work site such as a mine or like tunnel, where the tubular sections 3 can be formed and installed. The flexible panels 5 are rolled such that the side edges 9 can fastened together to form the tapered tubular sections 3 and then the smaller first end of one tubular section 3 is inserted into the larger second end of the next tubular section 3 and secured with the pulling elements 25 to form the duct system. The resulting duct system 1 is substantially airtight without the need for extra sealant.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

The invention claimed is:

1. A duct system comprising:
   a plurality of tubular sections connected together, each tubular section comprising:
   a flexible panel having a length between first and second end edges thereof, a first width between first and second side edges at the first end edge, and second width between first and second side edges at the second end edge, wherein the first width is less than the second width;
   inner and outer joiner plates attached to inner and outer faces of the flexible panel along the first side edge and extending outward from the first side edge such that a recess is formed between the inner and outer joiner plates, and wherein the second side edge is inserted into the recess and fastened in the recess to form the flexible panel into the tubular section with the inner joiner plate on an interior of the tubular section and the outer joiner plate on an exterior of the tubular section;
   wherein each tubular section has an open substantially circular first end with a first diameter at the first end edge of the panel and an open substantially circular second end with a second diameter at the second end edge of the panel, and wherein the first diameter is less than the second diameter;
   a plurality of first end anchors spaced around each tubular section at a first anchor distance from the first end of the tubular section;
   a corresponding plurality of second end anchors spaced around each tubular section at a second anchor distance from the second end of the tubular section;
   wherein the first end of each tubular section is inserted into the second end of an adjacent tubular section such that a portion of the outer face of each tubular section proximate to the first end thereof bears against a portion of the inner face of the adjacent tubular section proximate to the second end thereof;
   a plurality of end pulling elements, each end pulling element connected between one of the first anchors on one tubular section and one of the second anchors on the adjacent tubular section, and each end pulling element operative to exert a force drawing the connected first and second anchors together and pushing the outer face of the one tubular section against the inner face of the adjacent tubular section;
   a first reinforcing ring extending around each tubular section adjacent to the first end anchors such that the first end anchors are between the first end of the tubular section and the first reinforcing ring; and
   a second reinforcing ring extending around each tubular section adjacent to the second end anchors such that the second end anchors are between the second end of the tubular section and the second reinforcing ring,
   wherein an inner diameter of the first and second reinforcing rings substantially corresponds to an outer diameter of the tubular section.

2. The system of claim 1 wherein each second side edge is fastened in the corresponding recess by a plurality of side pulling elements, each side pulling element extending over the outer joiner plate and connected to side anchors attached to the tubular section on each side of the outer joiner plate; each side pulling element operative to exert a force drawing the second side edge into the recess.

3. The system of claim 1 comprising a lock tab extending from the second side edge of each flexible panel, and a corresponding lock notch defined in the first side edge of each flexible panel, the lock tab and lock notch configured such that when the second side edge is inserted into the recess, the lock tab flexes as the lock tab enters the lock notch and locks into the lock notch.

4. The system of claim 3 wherein the lock tab slopes inward from the outer face of the flexible panel toward the inner face of the flexible panel.

5. The system of claim 1 wherein the outer joiner plate extends from the first side edge of the flexible panel a greater distance than the inner joiner plate.

6. The system of claim 1 wherein outer edges of the inner and outer joiner plates adjacent to the recess are chamfered.

7. The system of claim 1 wherein the first reinforcing ring comprises two half rings fastened to each other after the second side edge is inserted into the recess to form the tubular section.

8. The system of claim 1 wherein the first end edge of each flexible panel comprises a shoehorn element extending from a middle portion of the first end edge.

9. The system of claim 1 wherein the first end of each tubular section is inserted into the second end of the adjacent tubular section such that first anchors on each tubular section are substantially aligned with second anchors on the adjacent tubular section.

10. The system of claim 1 wherein the first end of each tubular section is inserted into the second end of the adjacent tubular section such that the joiner plates on each tubular section are substantially aligned with the joiner plates on the adjacent tubular section.

11. The system of claim 1 wherein the first end of each tubular section is inserted into the second end of the adjacent tubular section at an insertion distance substantially equal to the first anchor distance, and wherein on each tubular section, the outer joiner plate extends from a first outer plate end thereof located the insertion distance from the first end of the tubular section to a second outer plate end thereof located at the second end of the tubular section.

12. The system of claim 11 wherein on each tubular section, the inner joiner plate extends from a first inner plate end thereof located at or in proximity to the first end of the tubular section to a second inner plate end thereof located the insertion distance from the second end of the tubular section.

13. The system of claim 1 comprising a sealing band around the second end of each tubular section, and a band tightener operative to exert a tightening force on the sealing band to force the inner face of the second end of each tubular section against the outer face of the first end of the adjacent inserted tubular section.

14. The system of claim 1 wherein at least one end pulling element is provided by a resilient strap.

15. The duct system of claim 1 wherein the force exerted by each end pulling element to push the outer face of the one tubular section against the inner face of the adjacent tubular section forms a substantially air tight seal between the outer face of the one tubular section and the inner face of the adjacent tubular section.

16. A method of providing a duct system, the method comprising:
forming a plurality of tubular sections, each tubular section formed by:
providing a flexible panel having a length between first and second end edges thereof, a first width between first and second side edges at the first end edge, and second width between first and second side edges at the second end edge, wherein the first width is less than the second width;
attaching inner and outer joiner plates to inner and outer faces of each panel along the first side edge such that the joiner plates extend outward from the first side edge such that a recess is formed between the inner and outer joiner plates;
inserting the second side edge into the recess and fastening the second side edge in the recess to form the panel into the tubular section with the inner joiner plate on an interior of the tubular section and the outer joiner plate on an exterior of the tubular section;
wherein each tubular section has an open substantially circular first end with a first diameter at the first end edge of the panel and an open substantially circular second end with a second diameter at the second end edge of the panel, and wherein the first diameter is less than the second diameter;
attaching a plurality of first end anchors spaced around each tubular section at a first anchor distance from the first end of the tubular section;
attaching a corresponding plurality of second end anchors spaced around each tubular section at a second anchor distance from the second end of the tubular section;
inserting the first end of each tubular section into the second end of an adjacent tubular section;
connecting an end pulling element between each of the first and second anchors and operating each end pulling element to exert a force drawing the connected first and second anchors together such that the first end of each tubular section is forced into the second end of the adjacent tubular section and such that a portion of the outer face of each tubular section proximate to the first end thereof bears against a portion of the inner face of the adjacent tubular section proximate to the second end thereof; and
wherein the circular shape of the first and second open ends is maintained by placing a first reinforcing ring tightly around each tubular section adjacent to the first anchors such that the first anchors are between the first end of the tubular section and the first reinforcing ring, and a second reinforcing ring tightly around each tubular section adjacent to the second anchors such that the second anchors are between the second end of the tubular section and the second reinforcing ring.

17. The method of claim 16 comprising forming each tubular section such that each tubular section is substantially airtight from the first end thereof to the second end thereof, and inserting each tubular section into the adjacent tubular section such that the connection between the tubular sections is substantially airtight.

18. A duct system comprising:
a plurality of tubular sections connected together, each tubular section comprising:
a flexible panel having a length between first and second end edges thereof, a first width between first and second side edges at the first end edge, and second width between first and second side edges at the second end edge, wherein the first width is less than the second width;
inner and outer joiner plates attached to inner and outer faces of the flexible panel along the first side edge and extending outward from the first side edge such that a recess is formed between the inner and outer joiner plates, and wherein the second side edge is inserted into the recess and fastened in the recess to form the flexible panel into the tubular section with the inner joiner plate on an interior of the tubular section and the outer joiner plate on an exterior of the tubular section;
wherein each tubular section has an open substantially circular first end with a first diameter at the first end edge of the panel and an open substantially circular second end with a second diameter at the second end edge of the panel, and wherein the first diameter is less than the second diameter;
a plurality of first end anchors spaced around each tubular section at a first anchor distance from the first end of the tubular section;
a corresponding plurality of second end anchors spaced around each tubular section at a second anchor distance from the second end of the tubular section;
wherein the first end of each tubular section is inserted into the second end of an adjacent tubular section such that a portion of the outer face of each tubular section proximate to the first end thereof bears against a portion of the inner face of the adjacent tubular section proximate to the second end thereof; and
a plurality of end pulling elements, each end pulling element connected between one of the first anchors on one tubular section and one of the second anchors on the adjacent tubular section, and each end pulling element operative to exert a force drawing the connected first and second anchors together and pushing the outer face of the one tubular section against the inner face of the adjacent tubular section;
wherein the first end edge of each flexible panel comprises a shoehorn element extending from a middle portion of the first end edge.

19. The system of claim 18 wherein each second side edge is fastened in the corresponding recess by a plurality of side pulling elements, each side pulling element extending over the outer joiner plate and connected to side anchors attached to the tubular section on each side of the outer joiner plate; each side pulling element operative to exert a force drawing the second side edge into the recess.

20. The system of claim 18 comprising a lock tab extending from the second side edge of each flexible panel, and a corresponding lock notch defined in the first side edge of each flexible panel, the lock tab and lock notch configured such that when the second side edge is inserted into the recess, the lock tab flexes as the lock tab enters the lock notch and locks into the lock notch.

21. The system of claim 20 wherein the lock tab slopes inward from the outer face of the flexible panel toward the inner face of the flexible panel.

22. The system of claim 18 wherein the outer joiner plate extends from the first side edge of the flexible panel a greater distance than the inner joiner plate.

23. The system of claim 18 wherein outer edges of the inner and outer joiner plates adjacent to the recess are chamfered.

24. The system of claim 18 comprising a reinforcing ring extending around each tubular section.

25. The system of claim 24 wherein the reinforcing ring comprises two half rings fastened to each other after the second side edge is inserted into the recess to form the tubular section.

26. The system of claim 18 wherein the first end of each tubular section is inserted into the second end of the adjacent tubular section such that first anchors on each tubular section are substantially aligned with second anchors on the adjacent tubular section.

27. The system of claim 18 wherein the first end of each tubular section is inserted into the second end of the adjacent tubular section such that the joiner plates on each tubular section are substantially aligned with the joiner plates on the adjacent tubular section.

28. The system of claim 18 wherein the first end of each tubular section is inserted into the second end of the adjacent tubular section at an insertion distance substantially equal to the first anchor distance, and wherein on each tubular section, the outer joiner plate extends from a first outer plate end thereof located the insertion distance from the first end of the tubular section to a second outer plate end thereof located at the second end of the tubular section.

29. The system of claim 28 wherein on each tubular section, the inner joiner plate extends from a first inner plate end thereof located at or in proximity to the first end of the tubular section to a second inner plate end thereof located the insertion distance from the second end of the tubular section.

30. The system of claim 18 comprising a sealing band around the second end of each tubular section, and a band tightener operative to exert a tightening force on the sealing band to force the inner face of the second end of each tubular section against the outer face of the first end of the adjacent inserted tubular section.

31. The system of claim 18 wherein at least one end pulling element is provided by a resilient strap.

\* \* \* \* \*